United States Patent
Lamb et al.

(10) Patent No.: US 10,054,963 B2
(45) Date of Patent: Aug. 21, 2018

(54) FOUR WAY VALVE WITH OIL FILLED ACTUATOR

(71) Applicant: Rostra Vernatherm, LLC, Bristol, CT (US)

(72) Inventors: Kevin W. Lamb, West Hartford, CT (US); Timothy Haskell, Kent, CT (US); Kenneth Lionello, Waterbury, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 771 days.

(21) Appl. No.: 14/269,243

(22) Filed: May 5, 2014

(65) Prior Publication Data
US 2015/0316939 A1 Nov. 5, 2015

(51) Int. Cl.
*G05D 23/02* (2006.01)
*G05D 23/12* (2006.01)
*F16H 57/04* (2010.01)

(52) U.S. Cl.
CPC ......... *G05D 23/12* (2013.01); *F16H 57/0412* (2013.01); *G05D 23/022* (2013.01)

(58) Field of Classification Search
CPC .. G05D 23/12; G05D 23/022; G05D 23/1333; F16H 57/0412; Y10T 137/7737
USPC .......................................... 251/57; 137/468
See application file for complete search history.

(56) References Cited

U.S. PATENT DOCUMENTS

| | | | | |
|---|---|---|---|---|
| 3,118,648 A | * | 1/1964 | Campbell | G05D 23/022 236/100 |
| 3,591,075 A | * | 7/1971 | Onishi | G05D 23/022 236/100 |
| 3,949,777 A | * | 4/1976 | Caldwell | G05D 23/128 137/271 |
| 4,190,198 A | * | 2/1980 | Casuga | F01M 5/007 236/34.5 |
| 4,288,033 A | * | 9/1981 | Wisyanski | G05D 23/134 236/100 |
| 4,460,006 A | * | 7/1984 | Kolze | E03B 7/12 126/588 |
| 4,846,219 A | * | 7/1989 | Schaefer | G05D 23/134 137/557 |
| 5,791,557 A | * | 8/1998 | Kunze | G05D 23/022 236/34.5 |
| 5,988,514 A | * | 11/1999 | Huang | G05D 23/1346 236/12.14 |
| 6,253,837 B1 | * | 7/2001 | Seiler | F16H 57/0413 137/625.29 |

(Continued)

*Primary Examiner* — Kun Kai Ma
(74) *Attorney, Agent, or Firm* — Alix, Yale & Ristas, LLP

(57) ABSTRACT

A thermally actuated flow control valve comprises a wax filled actuator assembly including a guide, a piston, a cup and a diaphragm. The cup is disposed at the guide first end and defines a cavity that receives a thermally activated pellet. The thermally activated pellet, diaphragm and piston act in concert to exert a variable actuating force as a temperature of a fluid increases between a first temperature $T_1$ and a second temperature $T_2$. The valve is arranged so that the cup and wax are directly exposed to fluid flowing through the valve and a peripheral shoulder of the cup acts as a valve member to control flow through the valve. One end of the guide also acts as a valve member to control flow between an inlet and outlet of a return flow pathway.

14 Claims, 8 Drawing Sheets

(56) References Cited

U.S. PATENT DOCUMENTS

| | | | |
|---|---|---|---|
| 6,386,150 B1* | 5/2002 | Iwaki | G05D 23/1333 |
| | | | 123/41.1 |
| 6,457,652 B1* | 10/2002 | Fukamachi | F01P 7/16 |
| | | | 236/34.5 |
| 6,772,958 B1 | 8/2004 | Lamb et al. | |
| 6,817,540 B2* | 11/2004 | Suda | G05D 23/275 |
| | | | 123/552 |
| 6,988,364 B1 | 1/2006 | Lamb et al. | |
| 7,469,841 B1 | 12/2008 | Lamb et al. | |
| 7,617,700 B2 | 11/2009 | Lamb et al. | |
| 8,490,885 B2 | 7/2013 | Lamb et al. | |
| 8,544,762 B1* | 10/2013 | Onishi | G01K 5/44 |
| | | | 236/100 |
| 8,973,537 B2* | 3/2015 | Lee | F01P 7/16 |
| | | | 123/41.29 |
| 9,133,952 B2* | 9/2015 | Lamb | F16K 11/044 |
| 2009/0107137 A1 | 4/2009 | Lionello et al. | |
| 2010/0032594 A1 | 2/2010 | Lamb et al. | |
| 2011/0186763 A1 | 8/2011 | Lamb et al. | |
| 2012/0247582 A1* | 10/2012 | Lamb | F16K 11/044 |
| | | | 137/468 |
| 2013/0264393 A1* | 10/2013 | Onishi | G01K 5/44 |
| | | | 236/93 A |
| 2013/0334327 A1 | 12/2013 | Lamb et al. | |
| 2014/0131460 A1 | 5/2014 | Lamb et al. | |

* cited by examiner

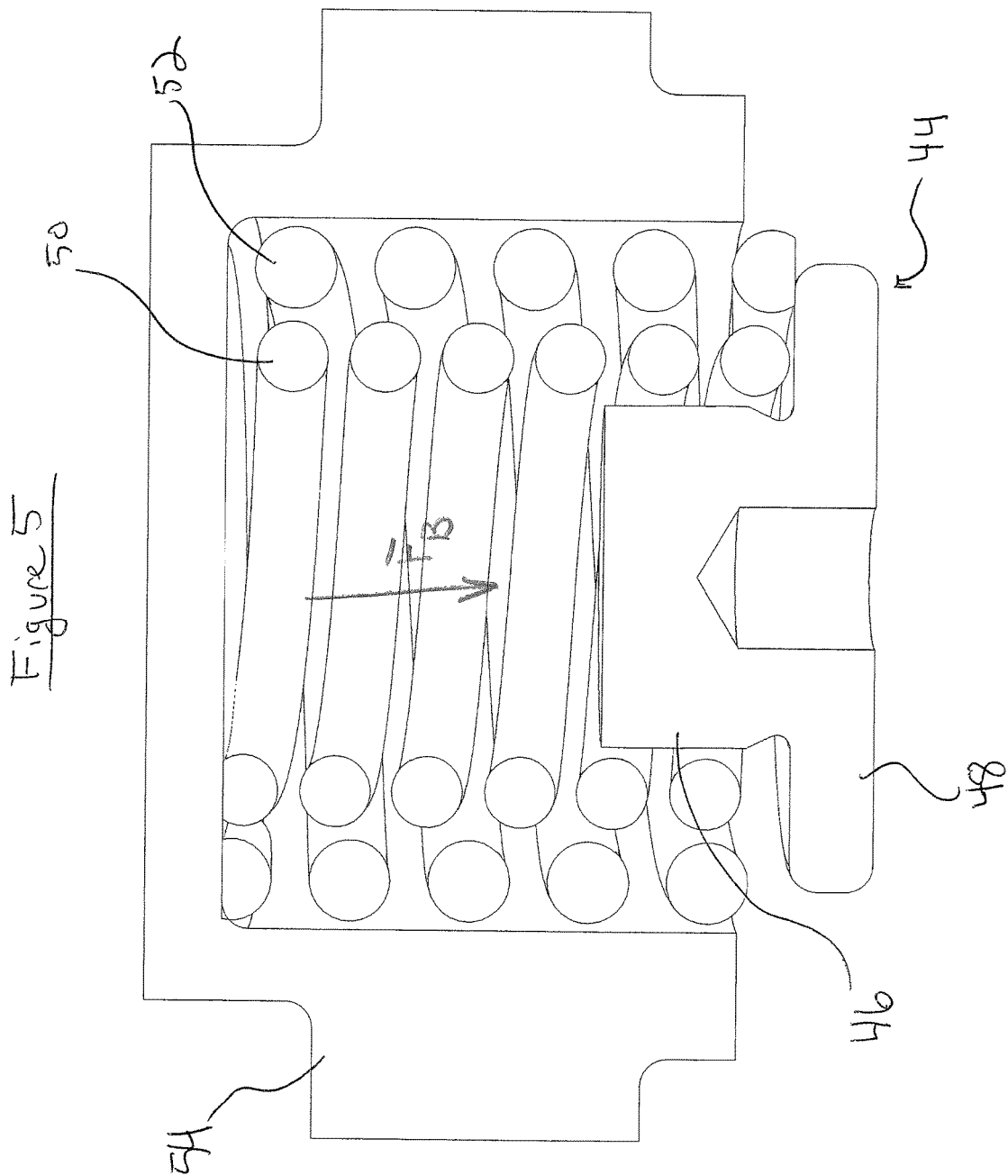

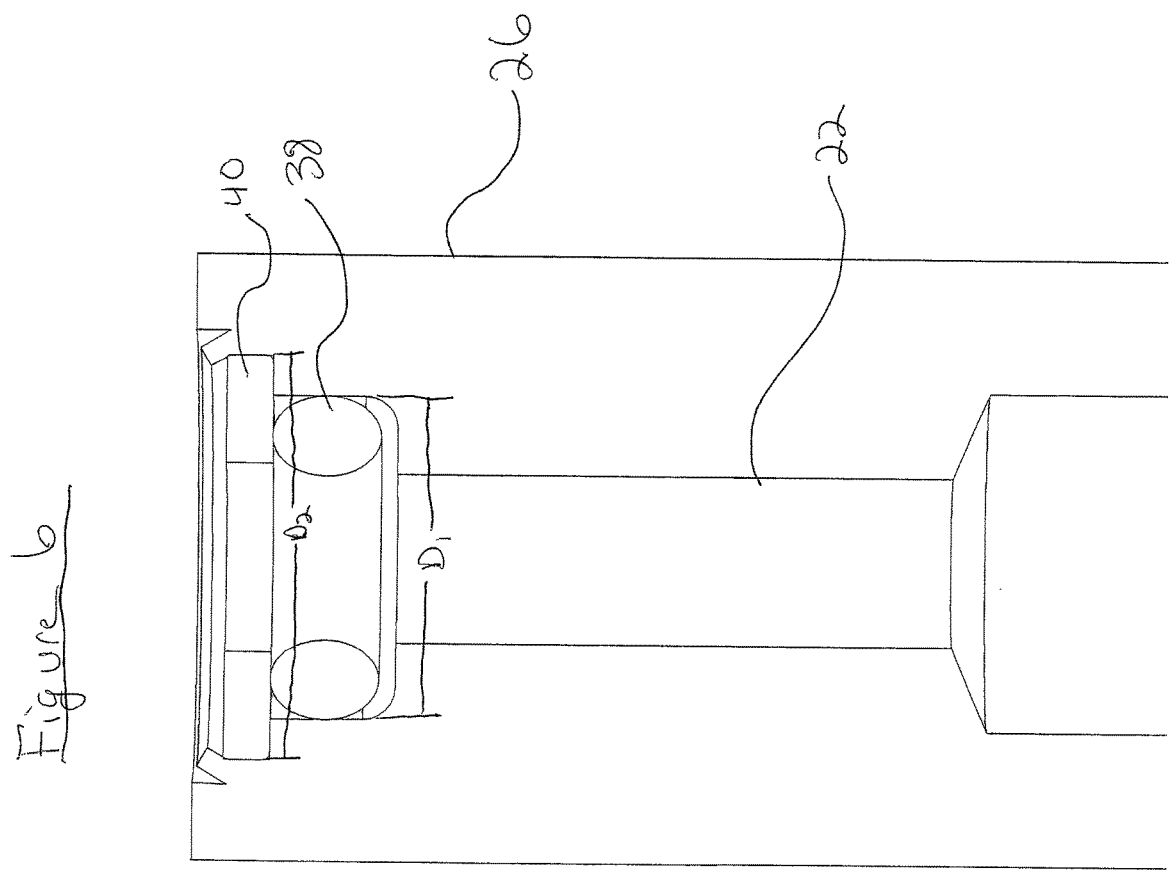

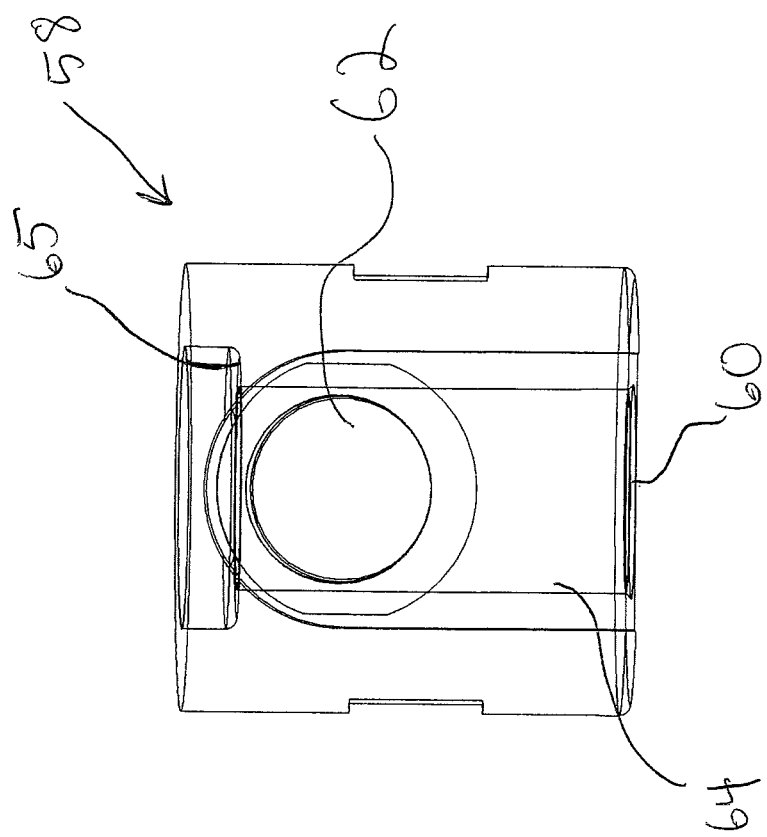

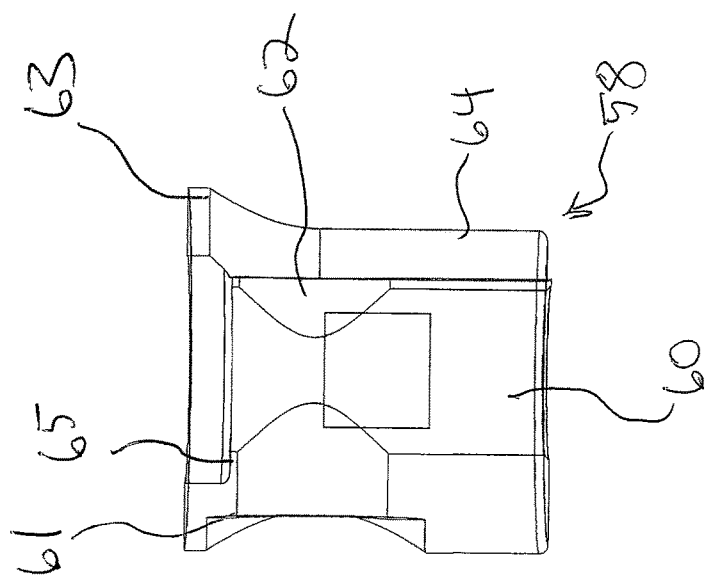

FOUR WAY VALVE WITH OIL FILLED ACTUATOR

BACKGROUND OF THE DISCLOSURE

The present disclosure relates to thermally actuated flow control valves. More particularly, the present disclosure relates to valves including wax-filled actuators employed to control the flow of fluid in automatic transmissions or other heat producing systems.

The use of wax-filled actuators or wax motors in automotive systems is well known. Wax actuators typically utilized in automotive systems are employed to regulate the flow of engine fluids and prevent overheating. Such actuators are designed to open or close in response to a predetermined change in temperature. Wax-filled actuators are reliable temperature-sensitive actuators that require no external energy, such as electricity, control signals, or externally applied actuation force, such as a cable or lever.

Automotive automatic transmissions may utilize a manifold having inlet and outlet fluid passages in fluid communication with a heat exchanger to control the temperature within the transmission. The manifold is typically configured to include a temperature-sensitive valve arranged to prevent fluid flow through a heat exchanger/radiator until the transmission fluid has warmed up. Prior art flow control valves including wax actuators have used a poppet-type valve and a wax motor to open and close passages in the manifold to direct transmission fluid according to the temperature of the fluid. The valve member typically comprises a planar disc that creates a seal with an annular seat disposed on the manifold cavity between the inlet and outlet pathways. In this actuator configuration, the temperature sensing part of the actuator is positioned in the cavity defined by the manifold and is not exposed directly to fluid flowing from the source of heat. Consequently, the sensitivity and accuracy of prior art actuators of this type can be improved.

Prior art actuators may employ a rubber plug to transmit force from the expanding wax to a piston that provides an actuating movement. This arrangement may absorb some of the force created by expansion of the wax, which may delay actuator response and limit the resulting range of actuator movement. Moreover, prior art valve assemblies may have restricted and/or turbulent fluid flow paths, causing significant pressure drops across prior art valves, thereby reducing the rate of fluid flow through the manifold.

Accordingly, there is a need in the art for an improved, temperature sensitive thermally actuated flow control valve.

SUMMARY

According to aspects of the present disclosure, a thermally actuated flow control valve comprises an actuator/valve assembly, a manifold and a return member. In one embodiment, the valve is configured for use in conjunction with a manifold having inlet and outlet pathways communicating with a central cavity. The central cavity defines an annular valve seat between the inlet and outlet pathways. A heat exchanger connects the outlet flow port of the inlet pathway and the inlet flow port of the outlet pathway. Here, the inlet pathway leads into the manifold, toward the heat exchanger and away from the heat source and the outlet pathway leads out of the manifold, away from the heat exchanger and toward the heat source.

The actuator assembly includes a guide, a piston, a cup, and a diaphragm. One end of the piston is situated in a chamber filled with incompressible fluid and the other end of the piston projects from the guide to abut a stop supported on the manifold. The incompressible fluid is arranged to deliver force from the expanding wax to the piston, which is sealed against the guide to contain the fluid.

The guide has first and second ends and defines a chamber adjacent the first end. The cup defines a concave interior cavity configured to receive a thermally activated wax pellet. The cup is disposed at the first guide end and a diaphragm is clamped between the periphery of the guide and the periphery of the cup intermediate the thermally activated wax pellet and the chamber. The diaphragm is fixed in contact with the first guide end and spans the open end of the cup, containing the wax in the cup. The guide and cup are configured so the thermally activated pellet senses and reacts to a temperature of a fluid flowing from the heat source.

A guide bore is defined adjacent the guide second end and communicates with the chamber. The guide bore is sized to closely receive the piston for reciprocal movement therein. The incompressible fluid may comprise an oil or hydraulic fluid which may lubricate the piston, ensuring that the piston reciprocates freely within the guide bore throughout the life of the flow control valve. A seal member retained at the guide second end seals against an outside surface of the piston to prevent leakage of the incompressible fluid. The incompressible fluid improves the temperature-dependent response of the wax actuator, as the incompressible fluid transmits substantially all the force from the expansion of the thermally activated wax pellet to the piston.

A base is received at an end of the central cavity opposite the annular seat, and includes a radial flange which rests on an annular stop. The base defines a stop that receives the piston second end, and is configured to provide pressure relief for over-extension of the actuator or when the temperature of fluid from the engine exceeds the normal range. Bias members are configured to permit limited movement of the base and stop when fluid or mechanical pressure on the base exceeds a pre-determined level.

The actuator is arranged in the chamber so that a peripheral shoulder, formed where the cup is joined to the guide, mates with the annular valve seat, with the cup end of the actuator acting as a valve member to open and close the passage between the cavity and the inlet pathway. This configuration situates the cup filled with temperature sensitive wax directly in the flow of fluid entering the manifold along the inlet pathway from the source of heat. A return member exerts a return bias on the cup end of the actuator to ensure the actuator returns to its shortened length when the temperature of fluid flowing through the manifold is below a pre-determined temperature.

The valve is configured to sense and react to a temperature of the fluid entering the manifold along the inlet pathway (from the heat source). The wax pellet, diaphragm, incompressible fluid, and piston act in concert to exert a variable, temperature-dependent actuating force in a direction axially opposite the biasing force. In one embodiment the actuating force increases between a first temperature of the fluid, $T_1$, and a second temperature of the fluid, $T_2$. Between $T_1$ and $T_2$ the actuator assembly extends progressively further away from the base between a first length and a second length, $L_1$ and $L_2$, respectively. In one embodiment, the guide has a collar portion at the guide first end which is folded over a radially extending shoulder of the cup to form a valve surface. The valve surface mates with the annular seat as the temperature of the fluid reaches $T_2$ and the actuator assembly reaches $L_2$. This position of the actuator/valve closes the passage between the cavity and the inlet pathway, diverting all fluid from the heat source to the heat exchanger. In one embodiment, a return member is sized to surround the cup and exert a return force against the valve surface (radially inward of the annular valve seat) in a direction axially opposite to the activation force.

An embodiment of the disclosed thermally actuated flow control valve may include a housing which defines a bore configured to closely receive at least part of the guide second end. The housing includes a fluid flow passage which transversely intersects the housing bore between the inlet and outlet ports of the outlet flow path. In the cold (retracted) position, the guide second end blocks flow between inlet and outlet ports of the outlet flow path, substantially blocking fluid flow through the heat exchanger. As the fluid entering the manifold warms up, the actuator extends away from the retracted position and allows fluid to flow between the inlet and outlet ports of the outlet flow path, while the cup end of the actuator progressively blocks flow through the chamber between inlet and outlet flow paths in the manifold. In this embodiment, the housing and guide cooperate to divert the fluid through the central cavity, past the valve seat and out the outlet pathway second flow port. Progressively more fluid flows through the housing between $T_1$ and $T_2$ while the cup end of the actuator progressively blocks fluid flow past the valve seat such that substantially none of the fluid flows through the central cavity and past the valve seat at a temperature generally equal to or greater than $T_2$. The housing may include an arcuate cut-out oriented facing the outlet flow port of the outlet pathway.

BRIEF DESCRIPTION OF THE DRAWINGS

Aspects of the disclosed embodiment will be described in reference to the drawings, where like numerals reflect like elements:

FIG. 5 shows a cross-sectional view of the base and first and second bias members of the thermally actuated flow control valve of FIG. 1, the piston, guide, cup, manifold and heat exchanger are omitted for clarity;

FIG. 6 shows a cross-sectional view of the second end of one embodiment of the guide;

FIG. 7 shows a frontal view of a housing of one embodiment of the valve; and

FIG. 8 shows a cross-sectional view of the housing of FIG. 7, the cross section taken longitudinally through the housing.

DETAILED DESCRIPTION

With reference to the drawings, wherein like numerals represent like parts throughout the Figures, a thermally actuated flow control valve 10 is disclosed herein. The flow control valve 10 is configured to provide reliable and efficient control of fluid flow through a manifold 12 as the temperature of the fluid changes. In a preferred embodiment, the fluid is transmission fluid flowing from and returned to a motor vehicle automatic transmission. Though the present disclosure primarily describes the flow control valve 10 as used in automotive applications, the flow control valve 10 may be used in a number of other suitable environments.

Figure 1:
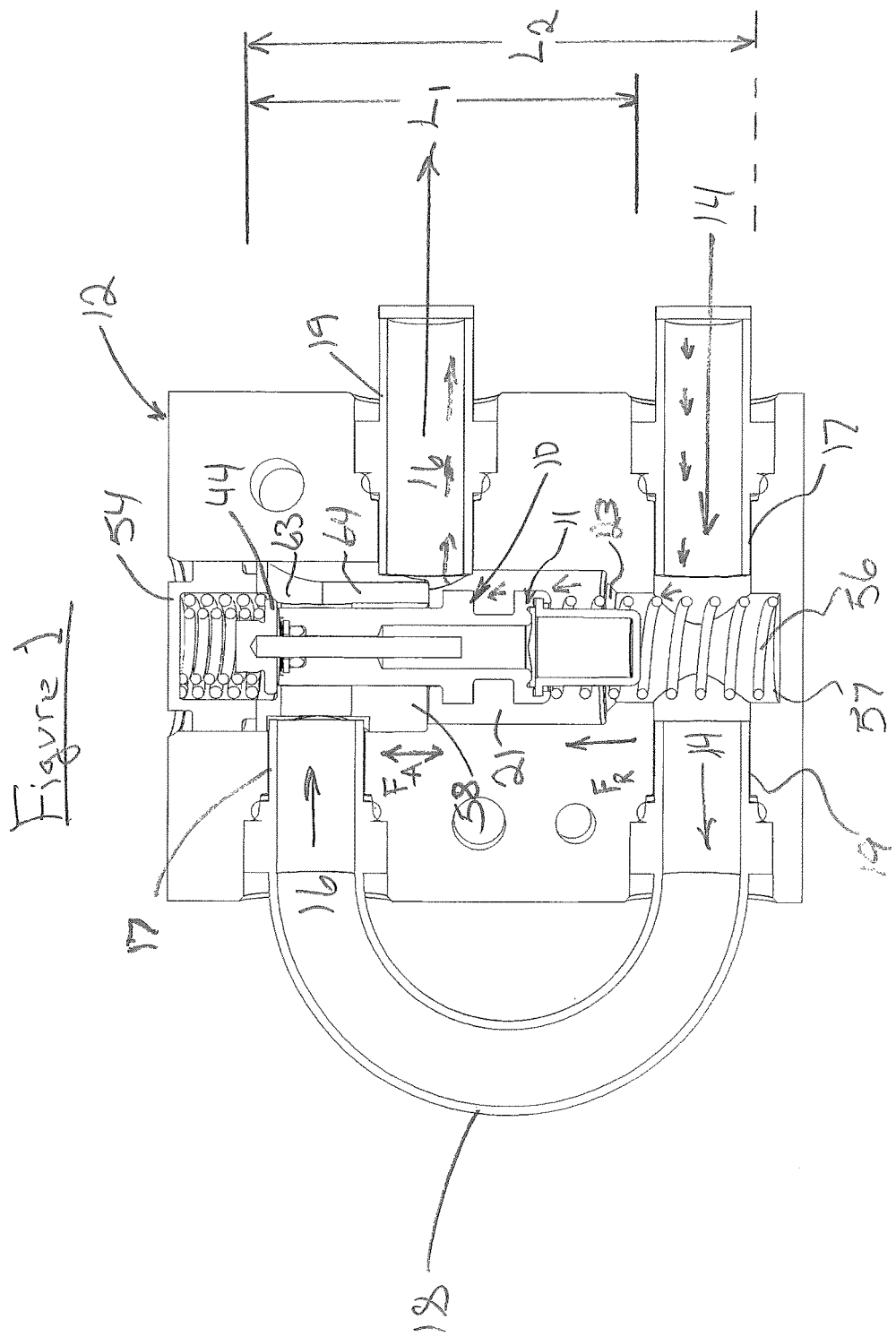
FIG. 1 shows a cross-sectional view of a thermally actuated flow control valve of the present disclosure where a fluid surrounding the flow control valve is below a first temperature $T_1$, a heat exchanger is also shown.
Figure 2:
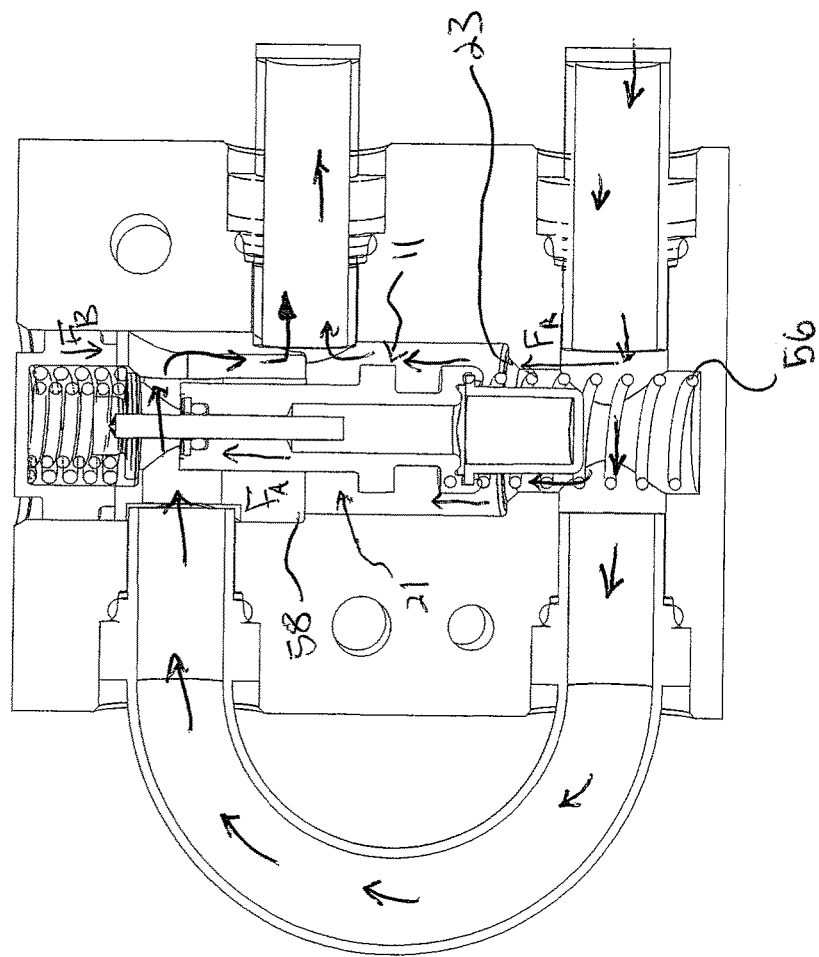
FIG. 2 shows a cross-sectional view of the thermally actuated flow control valve of FIG. 1, where the temperature of the fluid is between the first temperature $T_1$ and a second temperature $T_2$.
Figure 3:
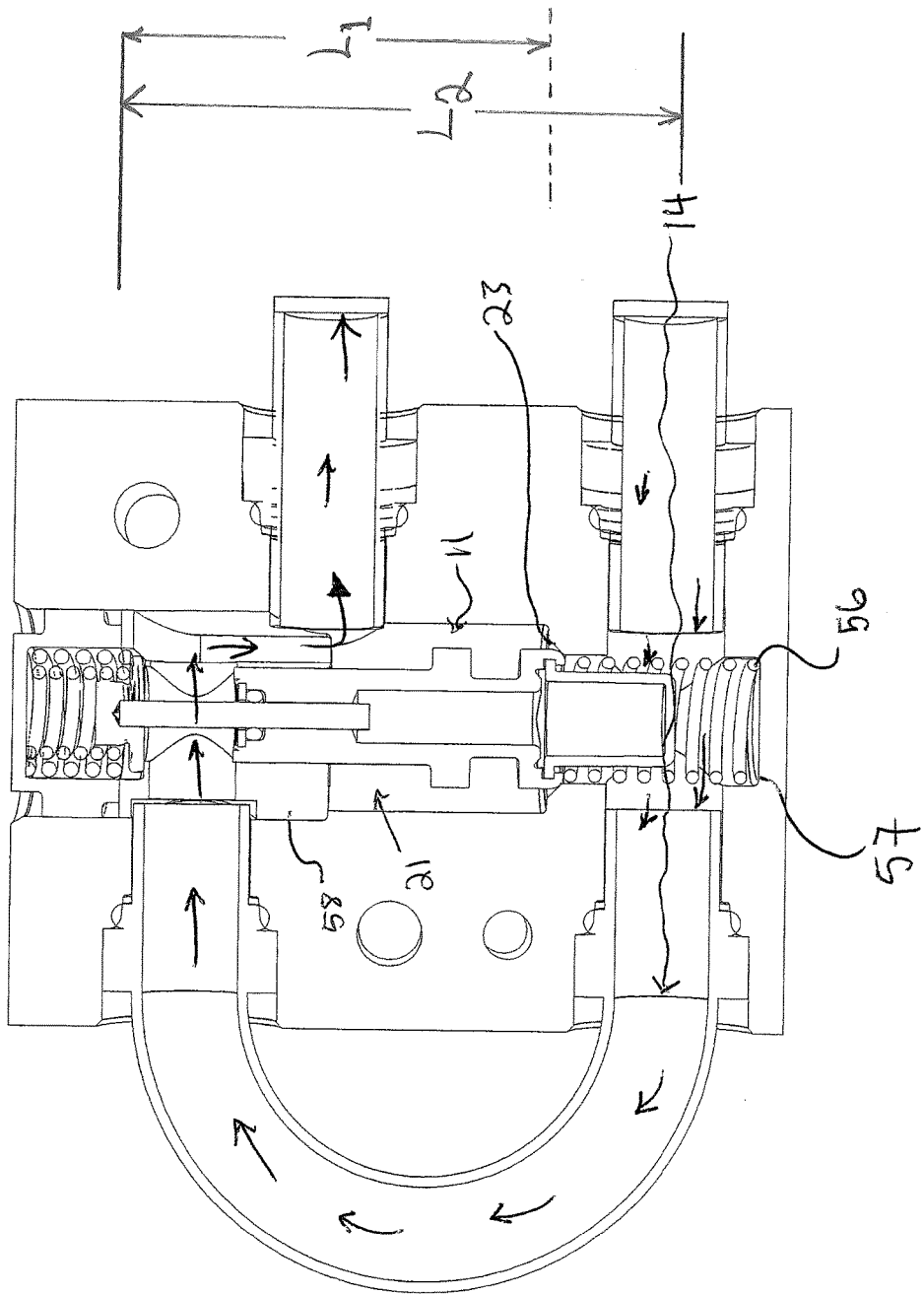
FIG. 3 shows a cross-sectional view of the thermally actuated flow control valve of FIG. 1, where the temperature of the fluid is at least equal to the second temperature $T_2$.

With reference to FIGS. 1-3, the manifold 12 has an inlet pathway 14 and an outlet pathway 16. The inlet and outlet pathways 14 and 16 each have inlet and outlet flow ports, 17 and 19, respectively. The manifold 12 defines a central cavity 21 which communicates between the inlet and outlet pathways 14, 16. The central cavity 21 defines an annular valve seat 23 intermediate the inlet pathway 14 and the cavity 21. The annular valve seat 23 cooperates with the cup end of the actuator assembly 11 to close the opening surrounded by the valve seat 23 dependent upon a temperature of the fluid flowing from the inlet pathway 14, as will be discussed in greater detail below.

A heat exchanger 18 connects the outlet flow port 19 of the inlet pathway 14 and the inlet flow port 17 of the outlet pathway 16. The heat exchanger 18 is depicted as an arcuate passageway having a plurality of fins (not shown) designed to increase the surface area available for heat dissipation. However, any heat exchanger configuration is compatible with the disclosed flow control valve 10. As will be discussed in greater detail below, fluid flowing into the inlet flow port 17 of the inlet pathway 14 comes from the transmission (not shown) or other source of heated fluid, through the manifold and returns to the transmission via the outlet flow port 19 of the outlet pathway 16.

Figure 4:
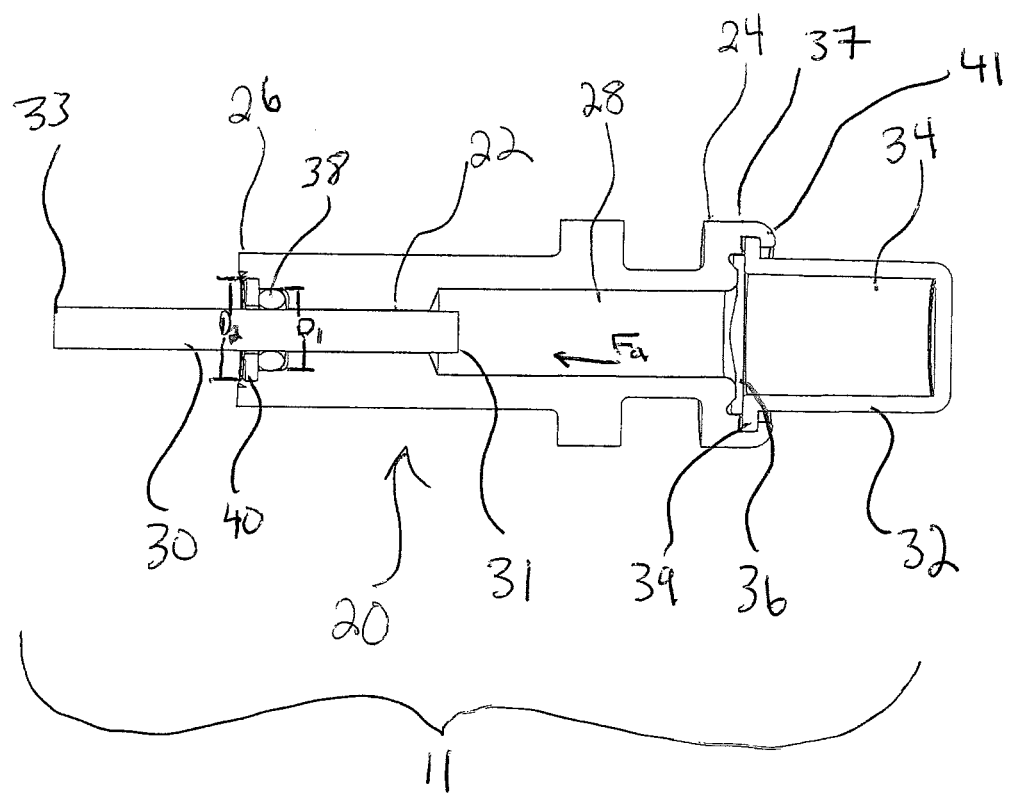
FIG. 4 shows a cross-sectional view of the guide, cup, diaphragm and piston of the thermally actuated flow control valve of FIG. 1, the manifold, heat exchanger, return member, bias members and base are omitted for clarity.

The flow control valve 10 includes an actuator assembly 11 having a guide 20, best shown in FIG. 4. The guide 20 has first and second ends 24 and 26, respectively, and defines a guide bore 22 adjacent the second end 26. The guide bore 22 is sized to closely receive a piston 30 having first and second ends 31 and 33, respectively. The guide also defines a generally cylindrical chamber 28 adjacent the first end 24 and in communication with the guide bore 22.

With reference to FIG. 4, a generally cylindrical cup 32 defining a concave interior cavity 34 is disposed at the guide first end 24. The cavity 34 receives a thermally activated pellet (not shown) that may comprise a thermally responsive hydrocarbon wax of the type typically employed in wax thermostatic elements. A specific composition of thermally responsive wax is selected for use with the valve 10, having very specific characteristics with respect to temperature. The pellet is solid at room temperature, but melts over a predetermined range of temperature, from a first temperature $T_1$ to a second temperature $T_2$. As the pellet transitions from a solid to a liquid between $T_1$ and $T_2$ the volume of the pellet increases. Once the temperature of the fluid flowing past the cup 32 reaches $T_2$, the entire pellet is in liquid form and has expanded to approximately its maximum volume.

A flexible diaphragm 36 is received in the guide first end 24 and clamped between the periphery of the cup 32 and periphery of the guide first end 24. As shown in FIG. 4, the diaphragm 36 is designed to seat at the guide first end 24 and provide a liquid-tight barrier between the cavity 34 and the chamber 28. The guide first end 24 may further comprise a collar portion 37 that is folded over a radially extending shoulder 39 of the cup 32. The collar 37 and shoulder 39 cooperate to retain the cup 32 at the guide first end 24, and additionally form a valve surface 41 surrounding the cup 32. As will be described in greater detail below, the actuator 11 may extend progressively further away from a base 44 between a first length $L_1$ and a second length $L_2$ dependent upon the temperature of the fluid. The valve surface 41 is configured to mate with the annular seat 23 at $L_2$, which completely separates the inlet and outlet pathways 14 and 16.

As best seen in FIGS. 4 and 6, the second end 26 of the guide defines first and second enlarged diameters, $D_1$ and $D_2$, respectively. $D_1$ is sized to receive an o-ring 38, while $D_2$ is sized to receive a washer 40. The o-ring 38 acts as a radial seal against the piston 30, while the washer 40 is staked to the guide second end 26 and retains the o-ring in a gland defined by the first diameter $D_1$. One of ordinary skill in the art will appreciate that other seal configurations may be utilized without departing from the scope of the disclosure.

In one embodiment, the chamber 28 is filled with an incompressible fluid such as ISO-100 hydraulic fluid. The o-ring 38 and the washer 40 cooperate to seal the hydraulic fluid within the chamber 28, allowing the incompressible fluid to act as a lubricant to ensure smooth reciprocation of the piston 30 within the guide bore 22. The fluid also imparts a variable actuating force, $F_A$, on the piston first end 31, which is created by the expansion of the thermally activated pellet. As the temperature rises between $T_1$ and $T_2$ the pellet expands within the cavity 34 causing the diaphragm 36 to extend into the chamber 28, increasing the variable actuating force $F_A$ that the incompressible fluid exerts on the piston first end 31. Substantially all of the variable actuating force $F_A$ created by the expansion of the pellet is imparted to the piston first end 31 because of the incompressible characteristics of the fluid received in the chamber 28.

Referring to FIGS. 1 and 5, the base 44 receives the piston second end 33. The base 44 has a body 46 and a flange 48 which extends radially away from the body 46. The body 46 is configured to sit within first and second concentric bias members 50 and 52, respectively. The first and second bias members 50 and 52 are received within a concave retaining member 54, which encloses one end of the central cavity 21. The concave retaining member 54 may be secured to the manifold 12 by any number of methods known in the art, such as a press fit or threaded connection. The first and second bias members 50 and 52 exert a biasing force $F_B$ against the base 44 to maintain the base 44 against an annular stop 65 (best seen in FIGS. 7 and 8) defined at the top of the housing 58. Bias members 50, 52 are selected to provide mechanical and fluid pressure relief in case temperature or fluid pressure within the manifold exceeds pre-determined limits. When the temperature exceeds $T_2$, the wax pellet may continue to expand and without some mechanical relief, the actuator might damage itself or the manifold 12. Further, a clogged heat exchanger could cause pressure in the inlet pathway 14 to spike. Under either circumstance, bias members 50, 52 compress, allowing base 44 to move away from its stop to relieve pressure as needed to prevent damage.

In the embodiment shown in FIGS. 1-3, a return member 56 has an inner diameter sized to surround the cup 32, and exert a return force $F_R$ in a direction axially opposite to movement of the actuator 11 resulting from increase in the actuation force $F_A$. The return member 56 is received in a return member pocket 57 defined by the manifold at a point intermediate the inlet and outlet flow ports 17, 19 of the inlet pathway 14. As the temperature decreases from $T_2$ to $T_1$, and the length of the actuator assembly 11 decreases from the second length $L_2$ to the first length $L_1$, the return member 56 exerts the return force $F_R$ on the actuator assembly 11 to ensure that the actuator assembly returns to its shortened length $L_1$.

Referring to FIGS. 1-3, 7 and 8, a housing 58 defines a bore 60 configured to closely receive at least a portion of the guide second end 26. The housing 58 also defines a fluid flow passage 62 which transversely intersects the housing bore 60 and connects the inlet and outlet ports 17, 19 of the outlet flow path 16. A first end 61 of the fluid flow passage 62 is in fluid communication with the inlet flow port 17 of the outlet pathway 16, while a second end 63 is configured in fluid communication with the outlet flow port 19 of the outlet pathway 16 via an arcuate cut out 64 oriented facing the outlet flow port 19 of the outlet pathway 16. As mentioned above, the valve 10 is configured to control the path in which fluid flows through the manifold dependent upon a temperature of the fluid. Referring to FIG. 1, when fluid flowing into the inlet pathway from the transmission is below the first temperature $T_1$, the cup 32, thermally active pellet, and diaphragm 36 exert no actuating force $F_A$ on the piston first end 31, as the thermally active pellet is completely solid and the actuator 11 is at its shortest length $L_1$. Below $T_1$ the valve 10 is in a cold (retracted) position, the guide second end 26 blocks flow between inlet and outlet ports 17, 19 of the outlet flow path 16, substantially blocking fluid flow through the heat exchanger 18. Meanwhile, the cup end of the actuator 11 is retracted from the valve seat 23, allowing fluid to pass through cavity 21 from the inlet pathway 14 to the outlet pathway 16, bypassing the heat exchanger 18.

Referring to FIGS. 2 and 3, as the temperature of the fluid increases above the first temperature $T_1$, more of the wax transitions from a liquid to a solid phase. FIG. 2 illustrates the valve assembly 10 at an intermediate length between $L_1$ and $L_2$ as the fluid flowing between the inlet pathway 14 and the outlet pathway 16 warms from $T_1$ toward $T_2$. As more of the wax becomes liquid, the variable actuating force $F_A$ on piston 30 increases. As $F_A$ increases, piston 30 extends from guide 20 to move the actuator assembly 11 further away from the base 44 between the first length $L_1$ and second length $L_2$. When the temperature of the fluid reaches $T_2$ and the actuator 11 reaches the second length $L_2$, the valve surface 41 of the actuator 11 mates with the annular valve seat 23. This position of the actuator assembly 11 and valve surface 41 closes the passage between the central cavity 21 and the inlet pathway 14, diverting all fluid from the heat source to the heat exchanger 18. Meanwhile, the guide second end 26 has been moved out of bore 62, clearing a path between the inlet and outlet ports 17, 19 of the outlet flow path 16.

As shown in FIGS. 1-3, the valve 10 is arranged within the cavity 21 so as to situate the cup 32 directly in the flow of fluid entering the manifold 12 along the inlet pathway 14. As the temperature increases between $T_1$ and $T_2$, the valve 10 of the present disclosure provides accurate temperature-dependent control of fluid because there is nothing between the temperature responsive wax and the fluid flowing in from the heat source.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A thermally actuated flow control valve for use in a manifold situated between a heat generating device and a heat radiating device, the manifold defining a fluid outlet flow path for fluid from the heat generating device and a fluid inlet flow path for fluid from the heat radiating device, said fluid outlet flow path and fluid inlet flow path connected by a bypass flow path including an annular valve seat, said thermally actuated flow control valve comprising:
an actuator assembly in said bypass flow path, said actuator assembly comprising:
a cup filled with thermally expandable material,
a guide having a first end secured to said cup and an annular shoulder extending radially from the junction of said cup and said guide, said guide defining a stepped bore having a first diameter adjacent said cup and a second, smaller diameter adjacent a second end of said guide, said first diameter of said stepped bore filled with an incompressible fluid exposed to expansion of said expandable material;
a piston situated for axial reciprocation in said second diameter of said stepped bore, said piston having a first end and a second end protruding from said second end of said guide, said first end of said piston exposed to force exerted on said incompressible fluid by expansion of said expandable material;
a base secured to the manifold and in contact with said second end of said piston,
wherein said expandable material expands in response to an increase in a temperature of the fluid from a first temperature $T_1$ to a second temperature $T_2$, said piston projects from said guide in response to expansion of said expandable material to move said cup and guide from a first position at fluid temperatures below $T_1$ in which said guide closes the fluid inlet flow path and said radially projecting annular shoulder is spaced from the annular valve seat permitting fluid flow through the bypass flow path, to a second position at temperatures above $T_2$ in which the fluid inlet flow path is open and said radially projecting annular shoulder is against the annular valve seat, preventing fluid flow through said bypass flow path.

2. The thermally actuated flow control valve of claim 1, wherein a volume of fluid flow through said fluid inlet flow path is inverse to a volume of fluid flow through said bypass flow path.

3. The thermally actuated flow control valve of claim 1, wherein said cup is continuously exposed to said fluid outlet flow path when said cup and guide are in said second position.

4. The thermally actuated flow control valve of claim 1, wherein said guide has a collar portion at said first end of said guide which is folded over said radially projecting annular shoulder such that said collar forms a valve surface configured to mate with said annular valve seat when said temperature of said fluid reaches $T_2$.

5. The thermally actuated flow control valve of claim 1, wherein said guide has a flange extending radially away from said guide intermediate said first and second ends of said guide.

6. The thermally actuated flow control valve of claim 1, wherein a seal member is received at said second end of said guide, and configured radially outwardly of and concentric with said piston, wherein said seal member prevents said incompressible fluid from leaking from said first diameter of said guide bore.

7. The thermally actuated flow control valve of claim 1, wherein a concave retaining member receives said base and first and second bias members bias said base against an annular stop defined at one end of a housing configured to receive said second end of said guide, wherein said first and second bias members act in concert to allow said actuator assembly to extend beyond a second length $L_2$ at fluid temperatures above $T_2$, said first and second bias members compressing such that said concave retaining member receives a part of said second end of said guide.

8. The thermally actuated flow control valve of claim 1, comprising a housing defining a bore sized to receive said second end of said guide, said housing including a fluid flow passage transversely intersecting said bore and configured in fluid communication with an said fluid inlet flow path, said fluid flow passage blocked by said second end of said guide at temperatures below $T_1$.

9. The thermally actuated flow control valve of claim 1, wherein said first diameter of said guide bore is sized to receive an o-ring and said second diameter of said guide bore is sized to receive a washer, said first diameter being smaller than said second diameter and said o-ring and said washer cooperatively sealing said first diameter of said guide bore against leakage of said incompressible fluid.

10. A method of controlling fluid flow through a manifold in response to a temperature of a fluid, said manifold arranged between a heat generating device and a fluid cooler, said manifold defining a fluid outlet flow path for fluid from the heat generating device, a fluid return flow path for fluid from an outlet of the fluid cooler to an inlet of the heat generating device, and a bypass flow path connecting said fluid outlet flow path and said fluid return flow path, said method comprising:
providing an actuator comprising an actuator body including a guide at an actuator body first end and a cup at an actuator body second end, said guide having a first end joined with said cup and a radially projecting annular shoulder from the first end of said guide to surround a volume of thermally expandable material, and a piston projecting from a second end of said guide in response to a force generated by expansion of said thermally expandable material;
mounting said actuator in said bypass flow path wherein projection of said piston moves said actuator body from a first position at a temperature of said fluid below a first temperature $T_1$ in which said actuator body first end closes said fluid return flow path and said bypass flow path is open, allowing fluid to flow around said actuator body from said fluid outlet flow path to said fluid inlet flow path, to a second position at a temperature of said fluid above a second temperature $T_2$ in which said actuator body second end closes said bypass flow path, said fluid return flow path is open, and said cup is exposed to fluid flowing in said fluid outlet flow path,
wherein said fluid outlet flow path remains open, a volume of fluid flow in the bypass flow path increases or decreases as a volume of fluid flow from the outlet of the fluid cooler decreases or increases, and said cup is continuously and directly exposed to fluid flowing through the manifold from said fluid outlet flow path.

11. The method of controlling fluid flow through said manifold of claim 10, wherein said step of mounting said actuator in said bypass flow path includes said guide having a collar portion at said first end of said guide which is folded over said radially projecting annular shoulder such that said collar forms a valve surface configured to mate with an annular valve seat of said bypass flow path when said temperature of said fluid reaches $T_2$.

12. The method of controlling fluid flow through said manifold of claim 10, wherein said step of providing an actuator comprising said actuator body includes said guide having a flange extending radially away from said guide intermediate said first and second ends of said guide.

13. The method of controlling fluid flow through said manifold of claim 10, wherein said step of mounting said actuator in said bypass flow path includes providing a concave retaining member that receives a base and first and second bias members bias said base against an annular stop defined at one end of a housing configured to receive said second end of said guide, wherein said first and second bias members act in concert to allow said actuator assembly to extend beyond a second length $L_2$ at fluid temperatures above $T_2$, said first and second bias members compressing such that said concave retaining member receives a part of said second end of said guide.

14. The method of controlling fluid flow through said manifold of claim 10, wherein said step of mounting said actuator in said bypass flow path includes providing a housing defining a bore sized to receive said second end of said guide, said housing including a fluid flow passage transversely intersecting said bore and configured in fluid communication with an said fluid inlet flow path, said fluid flow passage blocked by said second end of said guide at temperatures below $T_1$.

\* \* \* \* \*